United States Patent

Ishikawa et al.

[11] Patent Number: 5,969,669
[45] Date of Patent: *Oct. 19, 1999

[54] METHOD FOR DETERMINING POSITION OF MOBILE EARTH STATION IN SATELLITE COMMUNICATION SYSTEM

[75] Inventors: Hiroyasu Ishikawa, Warabi; Hideyuki Shinonaga, Hanno; Hideo Kobayashi, Fujimi, all of Japan

[73] Assignee: Kokusai Denshin Denwa Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/566,737

[22] Filed: Dec. 4, 1995

[30] Foreign Application Priority Data

Mar. 24, 1995 [JP] Japan ................................. 7-090098

[51] Int. Cl.⁶ ........................................................ G01S 5/12
[52] U.S. Cl. ................................ 342/357.02; 342/357.05; 342/357.16
[58] Field of Search ........................... 342/357, 458; 455/13.1, 13.2, 33.1, 56.1, 456, 12.1

[56] References Cited

U.S. PATENT DOCUMENTS 5,444,450  8/1995  Olds et al. .............................. 342/357
5,629,707  5/1997  Heuvel et al. ........................... 342/357

OTHER PUBLICATIONS

Hiroyasu Ishikawa, Hideyuki Shinonaga and Hide Kobayashi, "User Position Determination Method Using Single Non–Geostationary Satellite with Capibility to Remove Position Ambiguity," in *IEICE Trans. Commun.*, vol. E90–B, No. 1 (Jan. 1996), pp. 1–6.

*Primary Examiner*—Gregory C. Issing
*Attorney, Agent, or Firm*—Lackenbach Siegel Marzullo Aronson & Greenspan, P.C.

[57] ABSTRACT

A method is disclosed for uniquely determining the position of a mobile earth station in a mobile satellite communication system which employs a non-geostationary satellite with a multi-spot beams. A given point of a preknown position on the earth surface is defined as the center coordinate of a three-dimensional coordinate axis, information on the measured distance and Doppler shift amount between a mobile earth station of an unknown position and a non-geostationary satellite is used to repeat the estimation of the position of the mobile earth station a plurality of times, thereby obtaining the position of the earth station with high accuracy. Furthermore, by observing the estimated positions of the mobile earth station obtained as a plurality of solutions at proper time intervals, comparing with one another the movements of the respective estimated positions occurring with the local time proceeds and selecting the estimated position of the minimum movement, the estimated position of the mobile earth station is uniquely determined relative to its true position.

3 Claims, 5 Drawing Sheets

METHOD FOR DETERMINING POSITION OF MOBILE EARTH STATION IN SATELLITE COMMUNICATION SYSTEM

BACKGROUND OF THE INVENTION

The present invention relates to a method for determining a position of a mobile earth station for use in satellite communication systems such as fixed-satellite communication systems using a non-geostationary satellite, a mobile-satellite communication system and a personal-satellite communication system.

In recent years, there have been made many proposals and studies in the United States and European countries for commercial services using non-geostationary satellites intended primarily for mobile-satellite communication services.

In the United States, Motorola Inc. has proposed, with the aim of its commercial inauguration in 1998, an IRIDIUM project that implements a worldwide scale personal satellite communication system with a total of 66 LEO (Low Earth Orbiting) satellites flying at an altitude of about 780 km. Furthermore, there have been proposed in the United States a Global Star system by Qualcom Inc. that is a mobile-satellite communication system which continuously covers the whole world with a total of 48 LEO satellites flying at an altitude of 1,289 km and an Odyssey system by TRW Inc. which aims to set up a global network which covers nine main areas of the world, and moves toward realization of these systems are now growing more and more brisk.

On the other hand, European countries are also interested in these mobile satellite communication systems using non-geostationary satellites; especially, ESA (European Space Agency) has proposed and is now making study of an ARCHIMEDES project utilizing a highly elliptical orbit (HEO) that is suitable for areas in higher latitudes. Moreover, INMARSAT, an international mobile satellite communication organization, is proceeding briskly with research and development work on an INMARSAT-P system which is intended to provide, from 2000 up, a global-scale personal-satellite communication services via portable terminals through the use of 10 satellites placed in the medium earth orbit of an 10,355 km altitude. In the above-mentioned satellite communication systems using non-geostationary satellites, it is assumed that each portable terminal exists within the coverage of any spot beam of at least one non-geostationary satellite.

The mobile satellite communication system using non-geostationary satellites utilizes multi-spot beam satellites of the type that the beam coverage by one satellite is formed by a plurality of spot beams. In the multi-spot beam satellite, communication channels of different frequencies are usually allocated to adjacent spot beams so as to increase the efficiency of frequency by communication channels. Hence, in the mobile satellite communication system using non-geostationary satellites, the points listed below are important when getting position datas of users.

(1) To Minimize the Number of Spot Beams Which are Transmitted Over a Channel to Call a Mobile Earth Station.

That is to say, when the precise position of the mobile earth station to be called from a terrestrial network is unavailable, it is necessary that control signals for calling be transmitted over a wide beam areas. This impairs the utilization factor of frequency by the control channels, resulting in limitations being imposed on the maximum traffic volume of the control signals and transmitting power being wasted.

(2) To Utilize the Position Data on the Mobile Earth Station as Information Auxiliary to a Criterion for Starting a Spot Beam Handover and a Satellite Handover That is to say, when a mobile earth station continues communication across a global beam coverage by two satellites or two different spot beam, it is necessary to effect a handover (switching of a satellite beam for communication) between spot beams or global beams; in this instance, if the precise position of the mobile earth station is available, it is possible to perform the handover while keeping the communication link in a high quality state. An error in the timing of starting the handover will result in a cutoff of the communication link or degradation of its quality.

(3) To Assign a Proper Land Earth Station at the Time of Connecting a Call Between a Mobile Earth Station and a Land Earth Station That is to say, when a mobile earth station and a terrestrial network are connected via a land earth station, the service area coverage is allowed is limited to a certain range around the land earth station, but in the case of connecting a communication link between a mobile earth station and a land earth station, it is necessary to select a land earth station that maximizes the call duration. This requires precise position data of the earth station; if the precise position of the mobile earth station cannot be detected, then a wrong land earth station will be selected, incurring the possibility of the link being cutoff during communication.

(4) To Distinguish Borders.

That is to say, in a mobile-satellite communication system capable of providing global-scale personal communication services, it is possible to achieve communications from anywhere in the world, but in the case of establishing communications from an area near the border with a country where such global-scale personal communication services are prohibited, it is necessary to recognize the precise position of the mobile earth station and judge whether communications are possible or not.

(5) To Confirm the Position of a User in Emergency and Distress Call

That is to say, when a user is in a state of emergency such as an accident, if the precise position of the user can be detected on the part of a ground station, the user can be promptly rescued from danger.

(6) To Provide Additional Services (to Offer Position Data to Users)

If the precise position of a user, i.e. a mobile earth station can be detected, a position data service such as a navigation service can be offered to the user by presenting the information to the mobile earth station.

There have been proposed the following methods for determining a position of a mobile earth station.

(a) The position of the mobile earth station is estimated from area information of a mobile-location or existing-zone spot beam of the mobile earth station. In this instance, the position determination accuracy corresponds to the radius of the spot beam and the position of the mobile earth station can usually be estimated with an accuracy of hundreds to thousands of kilometers.

(b) In a three-dimensional or geocentric coordinate system wherein the center of gravity of the earth is at the origin, the equatorial plane or zone is in the x-y plane, a longitude of zero degree is in the positive orientation of the x-axis and an east longitude of 90 degrees is in the positive orientation of the y-axis, the position of a mobile earth station can be detected by calculating points of intersection of circular surfaces about a satellite through the use of data on a distance between the satellite and the mobile earth station measured a plurality of times (twice or more), or calculating points of intersection of conical surfaces about the satellite through the use of data on the Doppler shift amount between the satellite and the earth measured a plurality of times (twice or more), or calculating points of intersection of spherical surfaces and conical surfaces about the satellite through the combined use of such data. In this instance, there are two points of intersection, and this phenomenon is called ambiguity of solution; usually, the true position of the mobile earth station can be uniquely determined from the area code of the spot beam corresponding to the mobile earth station. Furthermore, it is customary in the art to adopt a scheme that expresses the position of the mobile earth station as an unknown variable and calculates it by the least mean square technique, instead of directly seeking a solution to simultaneous equations.

Incidentally, the distance between the satellite and the mobile earth station can be measured by providing both of a land earth station and the mobile earth station with timing-synchronized clocks, then measuring the propagation time of a signal sent from the land earth station or the mobile earth station in the latter or former, and multiplying the measured propagation time by the velocity of light. To measure the Doppler shift amount between the satellite and the mobile earth station, both of the land earth station and the mobile earth station are provided with frequency-synchronized frequency oscillators, then the amount of frequency offset of a signal sent from the land earth station or the mobile earth station is measured in the latter or former and the amount of frequency offset between the satellite and the mobile earth station is subtracted from the measured value, by which the amount of frequency offset or the Doppler shift amount between the satellite and the mobile earth station can be obtained.

(c) The mobile earth station detects the position of its own through utilization of the existing satellite navigation or positioning system such as GPS (Global Positioning System or GLONASS (GLObal Navigation Satellite System), or such an existing radio navigation system as loran C, and sends the position data to the land earth station.

Of the above-described mobile earth station position determination methods (a) to (c), it is the method (c) that is the most stable in positioning accuracy. With the method (b), the positioning accuracy is likely to vary materially from tens of meters to thousands of kilometers according to orbital parameters of the satellites used, the number of satellites that can be used for positioning, the distance to be measured, the accuracy of measuring the Doppler shift amount and the time intervals between individual position determinations. The method (a) can be applied only to rough positioning of the mobile earth station and, as a general rule, cannot be used for high accuracy positioning.

The above-mentioned mobile earth station position determining methods (a) to (c) for the satellite communication systems using non-geostationary satellites each have such problems as mentioned below. That is, in the method (a) of position determinating the mobile earth station on a spot-beam basis, the position determination accuracy scatters largely from hundreds to thousands of kilometers; hence, to ensure calling the mobile earth station from the terrestrial network side, it is necessary to do simultaneous transmission using all spot beams adjacent to the spot beam of the existing zone of the mobile earth station. This decreases the utilization factor of frequency by the signalling channel, presenting problems that the maximum traffic volume of the signalling traffic is limited and that the transmitted power is wasted. In a case where a mobile earth station needs to continue communication between spot beams or global beams, since the precise position of the mobile earth station is unavailable, it is necessary, for effecting the handover with the communication link in its high quality state, that the overlapping area of adjacent spot beams be extended to leave an extra link margin at the spot beam edge. As the result of this, spot beams cannot efficiently be located and expensive satellites with a high-output power transmitter are needed. Furthermore, an appropriate land earth station cannot be assigned at the time of call connection between a mobile earth station and a land earth station; hence, a wrong land earth station is selected and the link is likely to be disconnected during communication. Besides, this method can neither identify a border, nor confirm the position of a user in emergency and distress call, nor offer the navigation service.

Next, the method (b) has the following problems with the position determination procedure. That is, in the method of estimating the position of the mobile earth station in the geocentric coordinate system, appropriate values need to be set as initial values for the least mean square method so as to obtain the estimated position of the mobile earth station without divergence of the least mean square method. To meet with this requirement, however, it is necessary that all points on the earth surface expressed by the geocentric coordinate system be prepared as candidates for the initial values. If the initial values for the least mean square method are set wrong, the least mean square method converges to a different solution in which its error approaches zero, incurring the possibility of detecting an incorrect position of the mobile earth station. Moreover, when a plurality of solutions obtainable with the least mean square method are present in the same spot beam, it is impossible to apply the conventional method of identification according to the area code of each spot beam and the position of the mobile earth station cannot uniquely be determined. This phenomenon will hereinbelow be described with reference to FIG. 9. For the sake of brevity, however, the description will be given of a positioning scheme which measures twice the distance between a satellite and a mobile earth station through the use of one non-geostationary satellite.

FIG. 9 illustrates a scheme which performs position determination using the distances, $r_k$ (112) and $r_{k+1}$ (113), between the satellite and the mobile earth station measured at times $t_k$ and $t_{k+1}$. Intersections of circles, which are centered at intersections $Q(t_k)$ (110) and $Q(t_{k+1})$ (111) of a perpendicular dropped from the satellite to the earth surface and the latter at the times $t_k$ and $t_{k+1}$ and have radii $r_k$ (112) and $r_{k+1}$ (113), respectively, are obtained as two solutions A (116) and B (117) for the estimated position of the mobile earth station; in this instance, the two points A (116) and B (117) are symmetrically located with respect to a straight line n (115) passing through points Q ($t_k$) (110) and Q ($t_{k+1}$) (111). That is, one of the two points coincides with the true position of the mobile earth station, whereas the other is a falsely estimated position; in such a case, it is impossible to determine the truly estimated position from the results measured once. In consequence, as is the case with the scheme (a), the positioning accuracy of the mobile earth station scatters a largely as hundreds to thousands of kilometers. Hence, to ensure calling the mobile earth station from the terrestrial network side, it is necessary to perform simultaneous transmission for calling with all spot beams adjacent to the spot beam of the existing-zone of the mobile earth station, and accurate handover and the assignment of an appropriate land earth station cannot be done; furthermore, this scheme is incapable of identifying borders, confirming the position of a user in emergency and distress call and providing the navigation service.

In the case of the scheme (c), a receiver needs to be provided solely for utilizing the existing satellite positioning system or radio navigation system. This is likely to pose problems such an increase in the cost of mobile earth station terminal equipment, an increase in power consumption and limitations on the miniaturization of each terminal equipment. Besides, since the satellite positioning systems such as GPS and GLONASS are systems built primarily for military purposes, there is no absolute guarantee of receiving the positioning service at all times. Thus, it is considered to be risky that the position determining method of mobile earth stations depends on such conventional systems.

SUMMARY OF THE INVENTION

An object of the present invention is to provide a method for determining a position of a mobile earth station in a satellite communication system which permits fast, high-accuracy position determination of mobile earth stations and removes the ambiguity of the two estimated positions.

To attain the above object, according to the method for determining the position of a mobile earth station of the present invention for use in a satellite communication system which is composed of a non-geostationary satellite having the function of communicating with a terrestrial station, a mobile earth station with a transceiver device capable of communicating with the non-geostationary satellite and a land earth station connected to a terrestrial communication network and capable of communication with the mobile earth station via the non-geostationary satellite, an XYZ three-dimensional orthogonal coordinate system is assumed in which a given point on the earth surface, whose position is preknown, is positioned as a reference point and defined as the center coordinate of the three-dimensional coordinate axis, a straight line, which extends from the center point of the earth toward the center coordinate of the three-dimensional coordinate axis, is defined as the Z-axis, a straight line, which is in contact with the earth surface and orthogonal to the equator of the earth and passes through the center coordinate of the three-dimensional coordinate axis, is defined as the Y-axis, and a straight line, which is in contact with the earth surface and parallel to the equator of the earth and passes through the center coordinate of the three-dimensional coordinate axis is defined as the X-axis. Information about a distance measured between the mobile earth station of an unknown position and the non-geostationary satellite and a Doppler shift amount between them is used to make a first-order estimation of the position of the earth station, and in a newly updated three-dimensional coordinate system whose center coordinate is the estimated position of the mobile earth station obtained by the first-order estimation, the information about the above-mentioned measured distance and the Doppler shift amount is used again to make a second-order estimation of the position of the mobile earth station. Such an operation like as the second-order estimation is repeated until an error between the center coordinate of a finally updated three-dimensional coordinate system and the newly estimated higher-order value of the position of the mobile earth station falls short of a predetermined extremely small threshold value. By determining, as the estimated position of the mobile earth station, the higher-order estimated value obtained at the completion of the above-mentioned operation, the position of the mobile earth station can be detected with a high degree of accuracy.

According to another aspect of the present invention, by expressing the value of the Z-coordinate of the position of the earth station with the values of the X- and Y-coordinates set as two unknown variables through utilization of the fact that the earth is a sphere, it is possible to reduce the amounts of information needed for the measured distance and Doppler shift amount between the mobile earth station and the non-geostationary satellite.

According to another aspect of the present invention, by using the information about measured distances and Doppler shift amounts between the mobile earth station and the non-geostationary satellite, which are measured at different local times, errors in time which are attributable to instability in the position of the mobile earth station and in the accuracy of the clock mounted in the mobile earth station and errors in frequency which result from instability of the frequency oscillator mounted in each mobile earth station can be estimated at the same time. By removing the factors responsible for these errors, it is possible to achieve high accuracy position determination of the mobile earth station.

According to still another aspect of the present invention, in a satellite positioning system which performs position determination of a mobile earth station through utilization of the measured distance or Doppler shift amount between the non-geostationary satellite and the mobile earth station, the estimated area of the mobile earth station is limited to one-half the entire area of the beam coverage by the non-geostationary satellite through observation of changes in the distance between the satellite and the mobile earth station measured at proper time intervals; furthermore, by observing, whenever necessary, estimated positions of the mobile earth station obtained as a plurality of solutions at proper time intervals, then by comparing the amounts of shift of the respective estimated positions occurring with the local time proceeds and by selecting the estimated position of the minimum amount of shift, it is possible to uniquely determine the estimated position of the mobile earth station relative to its true position.

The initial values for the least mean square method need not be prepared in correspondence with points on the entire area of the earth surface, and by representing the initial values as concrete numerical values with several points (four or more points), it is possible to substantially reduce the amount of processing which includes redundant processing for determining the initial values for the least mean square method and the processing for prestoring a large number of initial values in and reading them out later from storage elements. Moreover, by expressing the value of the Z-coordinate of the position of the mobile earth station with the values of the X- and Y-coordinates used as two unknown variables through utilization of the fact that the earth is a sphere, it is possible to decrease the amount of information needed for the measured distance and Doppler shift amount between the mobile earth station and the non-geostationary satellite. This permits reduction of the time for detecting the position of the earth. Besides, by estimating and compensating for errors in time resulting from instability in the accuracy of the clock of the mobile earth station and errors in frequency arising from instability of the frequency oscillator of the mobile earth station, high-accuracy position determination of the mobile earth station can be achieved.

By observing changes in the data on the measured distance between the satellite and the mobile earth station, the estimated area of the mobile earth station can be limited to one-half the area of the beam coverage by the non-geostationary satellite, and by limiting the number of initial values for the least means square method to two, the amount of processing for position determination can be reduced. Moreover, by observing, whenever necessary, estimated positions of the mobile earth station which are calculated as a plurality of solutions, by comparing with each other the amounts of shift of the estimated positions which occur with the local time proceeds, and by selecting an estimated position of the minimum amount of shift, the estimated position of the mobile earth station can uniquely be determined relative to its true position. With the operations described above, the problem of ambiguity in the estimated position of the mobile earth station in the same spot beam, which cannot be settled in the past, can easily be solved, and hence the position of the user can uniquely be determined with high accuracy.

BRIEF DESCRIPTION OF DRAWINGS

The present invention will be described in detail below in comparison with reference to accompanying drawings, in which.

PREFERRED EMBODIMENTS OF INVENTION

Figure 1:
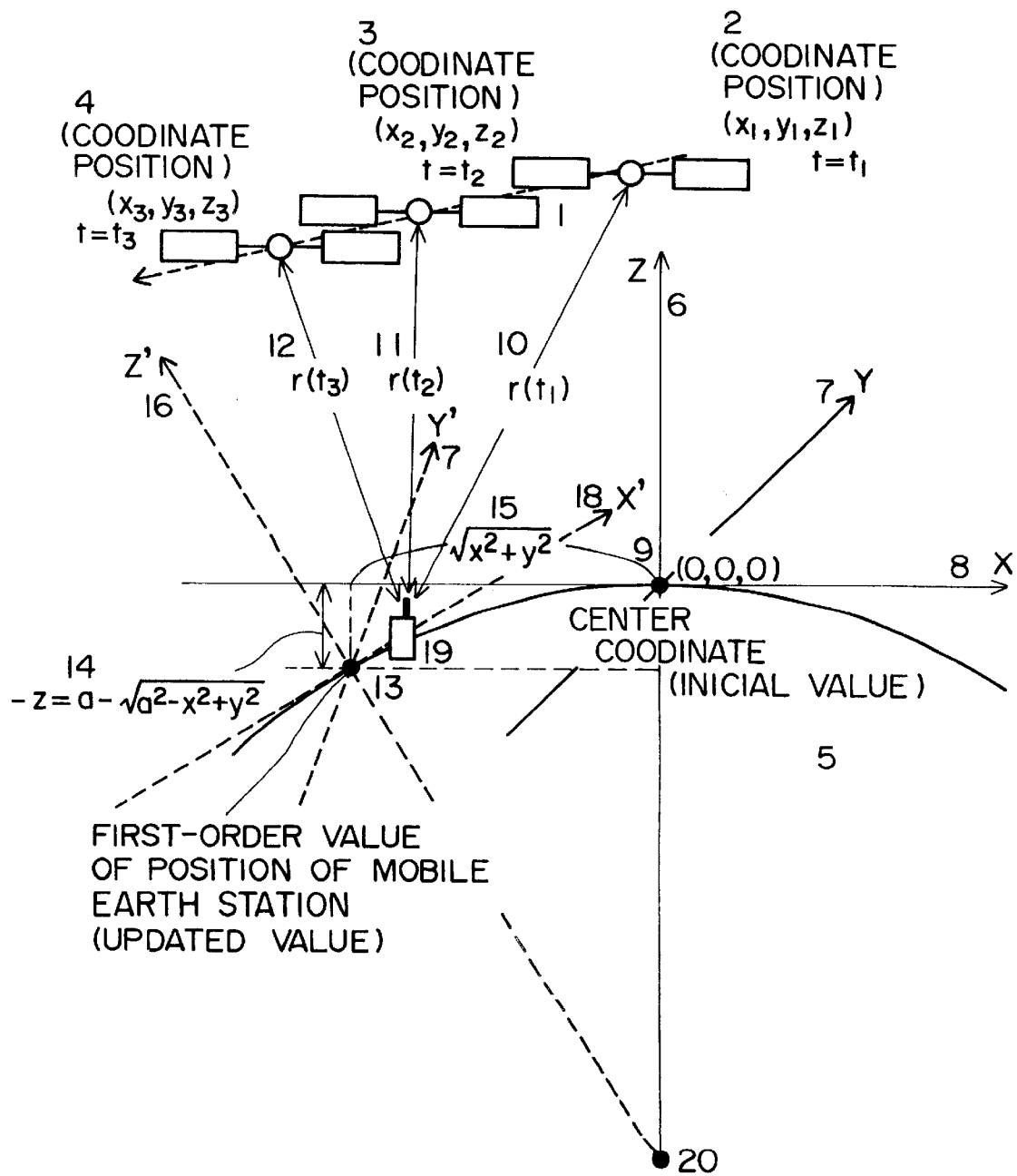
FIG. 1 is a diagram showing a coordinate axis system on which is based calculations of the mobile earth station position determination method in a satellite communication system according to the present invention.

In FIG. 1 there is shown a coordinate axis system on which the processing scheme of the satellite position determination system according to the present invention is based. In FIG. 1, a given point on the earth surface 5, whose position is preknown, is positioned as an initial value 9 of a reference point and is defined as the center coordinate (0, 0, 0) of the three-dimensional coordinate axis XYZ. Incidentally, a straight line which extends from the central point 20 of the earth toward the initial value 9 of the reference point, is defined as a Z-axis 6; a straight line, which is in contact with the earth surface and orthogonal to the equator of the mobile earth station and passes through the initial value 9 of the reference point, is defined as a Y-axis 7; and a straight line, which is in contact with the earth surface and parallel to the equator of the earth and passes through the initial value 9 of the reference point, is defined as an X-axis 8. The initial value 9 of the reference point can be set using such schemes as listed below.

(Scheme 1) Fixed values (latitude, longitude) of a plurality of given points on the earth surface are selected as candidates for the initial value and the initial value of the reference point nearest to the spot beam of the existing zone of the mobile earth station is set as the origin of the three-dimensional coordinate axis.

(Scheme 2) The sub-satellite point is set as the initial value of the reference point. In this instance, the reference point always shifts as the satellite moves, but since the orbit of the satellite can be known beforehand, no complicated calculations are needed.

(Scheme 3) The central point of the spot beam is set as the initial value of the reference point. In this case, it is necessary to prepare reference points of the same number as that of spot beams with which respective satellites irradiate the earth surface and, as is the case with Scheme 2, the reference points always shift as the satellite move, but since the orbit of the satellite can be known beforehand, no complicated calculations are needed.

On the other hand, a non-geostationary satellite 1 orbits the earth 5 and its orbiting period is usually set to be shorter than the period of rotation of the earth. Observing the non-geostationary satellite 1 from the earth surface 5, the satellite will move flying over the mobile earth station as the local time proceeds. That is, as shown in FIG. 1, the coordinate position of the non-geostationary satellite 1 shifts to $(x_1, y_1, z_1)$, $(x_2, y_2, z_2)$ and $(x_3, y_3, z_3)$ as the passage of time $t=t_1$, $t_2$, $t_3$. Now, a description will be given, for example, of the position determination method for a mobile earth station using the least mean square method, according to which a distance between a mobile earth station 19 and the satellite is measured three times, that is, at the above-said points in time, and the position determination of the mobile earth station and the estimation of a clock error of the clock mounted on the mobile earth station are carried out at the same time using the measured distance data. In a coordinate system whose origin (0, 0, 0) is the initial value of the reference point, letting the distances between the mobile earth station 19 and the satellite measured at times $t_1$, $t_2$ and $t_3$ be represented by $r(t_1)$, $r(t_2)$ and $r(t_3)$, respectively, true distances at the above-said times by $r_0(t_1)$, $r_0(t_2)$ and $r_0(t_3)$, and general equations of estimated distances by $r'(t_1)$, $r'(t_2)$ and $r'(t_3)$, true positions of the satellite by $(x'(t_1), y'(t_1), z'(t_1))$, $(x'(t_2), y'(t_2), z'(t_2))$ and $(x'(t_3), y'(t_3), z'(t_3))$, and letting the estimated position of the mobile earth station be represented by $(x, y, f(x, y))$ and an estimated value of an error in the propagation path by $s$, these parameters are related to one another by the following mathematical expression.

$$r(t_1)=r_0(t_1)+rerror(t_1) \quad (1)$$

$$r(t_2)=r_0(t_2)+rerror(t_2) \quad (2)$$

$$r(t_3)=r_0(t_3)+rerror(t_3) \quad (3)$$

(where rerror(ti) is an error in the propagation distance by a clock error.)

$$r'(t_1)=((x'(t_1)-x)^2+(y'(t_1)-y)^2+(z'(t_1)+f(x, y))^2)^{1/2}+s \quad (4)$$

$$r'(t_2)=((x'(t_2)-x)^2+(y'(t_2)-y)^2+(z'(t_2)+f(x, y))^2)^{1/2}+s \quad (5)$$

$$r'(t_3)=((x'(t_3)-x)^2+(y'(y_3)-y)^2+(z'(t_3)+f(x, y))^2)^{1/2}+s \quad (6)$$

$$f(x, y)=a0-(a0^2-x^2-y^2)^{1/2} \quad (7)$$

Here, $$\delta f(x,y)/\delta x = x/(a_0^2-x^2-y^2)^{1/2}, \delta f(x,y)/\delta y = y/(a_0^2-x^2-y^2)^{1/2} \quad (8)$$

$$\delta r'(t_i)/\delta x = [-(x'(t_i)-x)+\{x(z'(t_i+f(x,y)))/(a_0^2-x^2-y^2)^{1/2}\}](r'(t_i))^{-1/2} \quad (9)$$

$$\delta r'(t_i)/\delta y = [-(y'(t_i)-y)+\{y(z'(t_i+f(x,y)))/(a_0^2-x^2-y^2)^{1/2}\}](r'(t_i))^{-1/2} \quad (10)$$

$$\delta r'(t_i)/\delta s = 1 \quad (11)$$

(where i=1, 2, 3)

Here, let the x and y coordinates of the mobile earth station and an approximate value of s in the course of calculation by the least mean square method be represented by sx, sy and ss, respectively, and corrected values of the x and y coordinates and the estimated value s by dx, dy and ds, respectively.

At this time, by expressing $$F = \begin{bmatrix} \frac{\delta r'(t_1)}{\delta x} & \frac{\delta r'(t_1)}{\delta y} & 1 \\ \frac{\delta r'(t_2)}{\delta x} & \frac{\delta r'(t_2)}{\delta y} & 1 \\ \frac{\delta r'(t_3)}{\delta x} & \frac{\delta r'(t_3)}{\delta y} & 1 \end{bmatrix} \quad (12)$$

$$X = \begin{bmatrix} dx \\ dy \\ ds \end{bmatrix} \quad (13)$$

the values dx and dy can be derived from $$R = \begin{bmatrix} r(t_1) - r'(t_1) \\ r(t_2) - r'(t_2) \\ r(t_3) - r'(t_3) \end{bmatrix} \quad (14)$$

$$x = (F^T F)^{-1} F^T R \quad (15)$$

These adjusted values are used to adjust the values sx and sy as follows:

$$sx = sx - dx \quad (16)$$

$$sy = sy - dy \quad (17)$$

$$ss = ss - ds \quad (18)$$

The setting of initial values for sx, sy and ss will be described later on.

The above calculations are repeated and stopped when dx and dy become smaller than certain values, and the x and y coordinates sx and sy are determined to represent an estimated position of the mobile earth station. That is, $$x = sx \quad (19)$$

$$y = sx \quad (20)$$

$$s = ss \quad (21)$$

Incidentally, $-z=f(x,y)$ represents the length of the perpendicular dropped from the position of the mobile earth station on the earth surface to the XY plane of the coordinate system with the origin at the reference point.

Next, a first-order estimated value 13 of the position of the mobile earth station obtained by the above procedure is set as an updated value of the reference point, which is followed by estimating again the position of the mobile earth station in a coordinate system centered at the estimated position. That is, a second-order estimated value of the position of the mobile earth station is calculated using the same procedure as Eqs. (1) through (21) in a newly updated X'Y'Z' three-dimensional coordinate system wherein a straight line, which extends from the central point 20 of the earth toward the updated value 13 of the reference point, is defined as a Z'-axis 16, a straight line, which is in contact with the earth surface and orthogonal to the equator of the earth and passes through the updated value 13 (i.e., the first-order estimated value 13) of the reference point, is defined as a Y'-axis 17 and a straight line, which is in contact with the earth surface and parallel to the equator of the earth and passes through the updated value 13 of the reference point, is defined as an X'-axis 18. Thereafter, this operation is repeated a plurality of times until the error between the center coordinate of a finally updated three dimensional coordinate system and the newly estimated higher-order value of the position of the mobile earth station comes to fall short of a predetermined, extremely small threshold value, and the estimated position at the completion of the operation is determined to be the position of the mobile earth station. This scheme permits extremely high accuracy position determination of the mobile earth station.

Furthermore, it is also possible to employ, by the same scheme as the aforementioned one using a plurality of pieces of measured distance data, the method which simultaneously estimates the position of the mobile earth station and the frequency error of the frequency oscillator by measuring the Doppler shift amount three times or more and the method which simultaneously estimates the position of the mobile earth station, the timing error arising from instability of the clock of the mobile earth station and the frequency error resulting from instability of the frequency oscillator of the mobile earth station by measuring the Doppler shift amount and the distance between the satellite and the mobile earth station twice or more at one time. That is, the least mean square method can be applied to the three-dimensional orthogonal coordinate system centered at the reference point, by obtaining an estimating equation for the Doppler shift amount between the satellite and the mobile earth station and then obtaining a partial differentiation expression on the time of the estimating equation.

Figure 2:
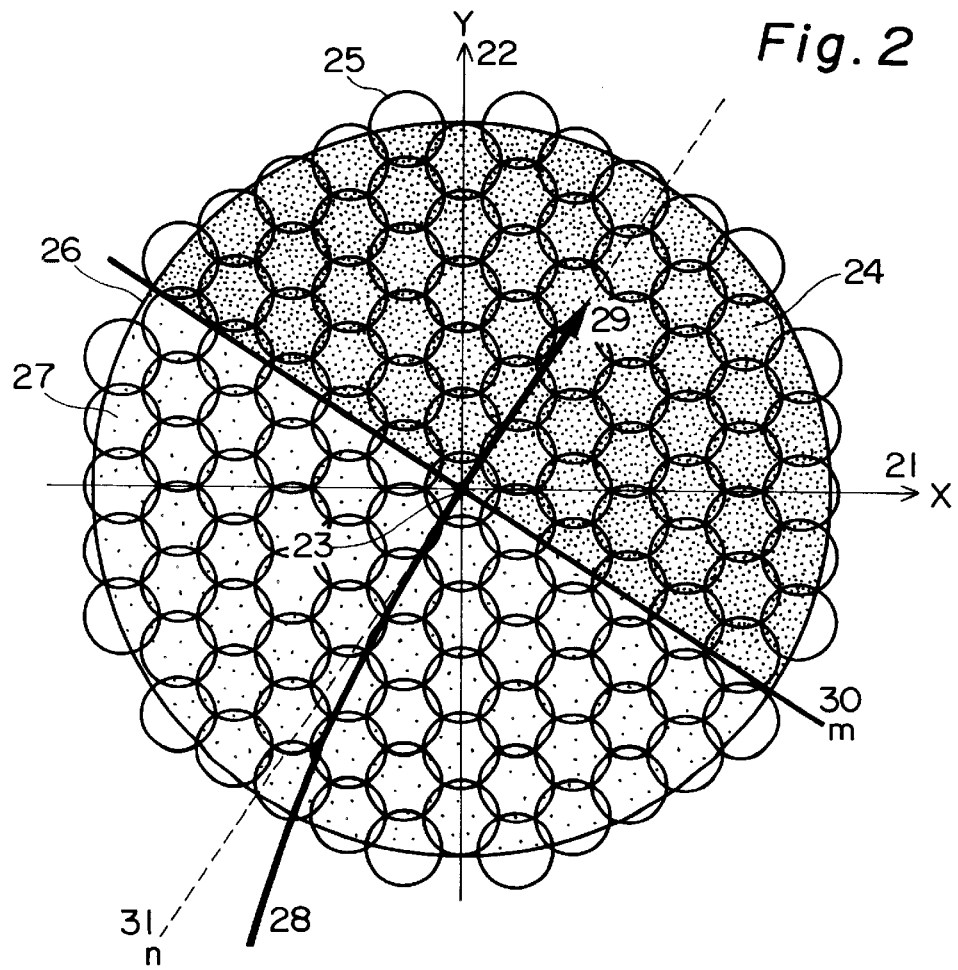
FIG. 2 is a diagram showing an example of a multi-spot beam for irradiating the earth surface from a non-geostationary satellite.

Next, a description will be given, with reference to FIGS. 2 to 5, of embodiments of the method for setting the initial value (sx, sy) of the estimate (x, y) of the position of the mobile earth station which is needed in the algorithm of the least means square method. FIG. 2 illustrates an embodiment of a multi-spot beam 26 with which the non-geostationary satellite irradiates the earth surface. The multi-spot beam 26 is composed of a plurality of spot beams 25. The spot beams 25 are independent of one another, and by the adoption of the same cell configuration as that of a terrestrial cellular system, the utilization factor of frequency can be enhanced. In FIG. 2, the X-axis (21) and the Y-axis (22) indicate two orthogonal axes of a three-dimensional orthogonal coordinate system centered at a sub-satellite point 23, the X-axis (21) is parallel to the equator, the Y-axis (22) is orthogonal to the equator, and the XY plane is a plane that passes through the sub-satellite point 23 and makes contact with the earth surface. The arrow 29 indicates the velocity vector of the sub-satellite point, a straight line n (31) is one that contains the velocity vector 29, a straight line m (30) is one that passes through the sub-satellite point 23 and is orthogonal to the straight line n (31), and a curve 28 indicates the locus of the sub-satellite point 23 on the earth surface. Now, a new scheme will be proposed by which the method of setting the initial value (sx, sy) necessary for the algorithm of the least mean square method is classified into four categories as listed below. Incidentally, let it be assumed that the position of the mobile earth station can be detected at least on a spot beam basis by utilizing a spot beam ID that is broadcast from a land earth station.

(1) When the mobile earth station to be detected is in a spot beam 32-1 other than a spot beam intersecting the straight line n (31) or straight line m (30) (FIG. 3), the initial value for the least mean square method is set at the center 39 of the spot beam 32-1. Incidentally, the initial value for the least mean square method need not always be set to the center of the spot beam but may also be set at any point within the spot beam.

Figure 4:
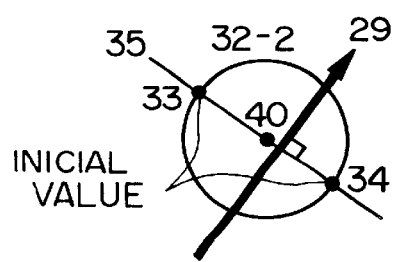
FIG. 4 is a diagram showing another embodiment of the method for setting initial values for the least mean square method employed in the present invention.
Figure 5:
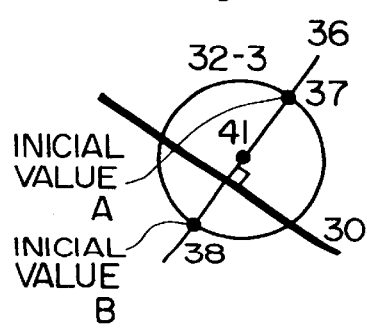
FIG. 5 is a diagram illustrating another embodiment of the method for setting initial values for the least mean square method employed in the present invention.

(2) When the mobile earth station to be detected intersects the straight line n (31), the position determination of the mobile earth station is performed using, as two initial values (33, 34), intersections of a straight line passing through the center 40 of a spot beam 32-2 and perpendicular to the straight line n (31) and the spot beam coverage end as shown in FIG. 4. The arrow 29 is the velocity vector of the sub-satellite point, as shown in FIG. 2. In this instance, two solutions are obtained; one of them can be calculated as substantially a fixed point independently of time, but the other varies greatly as the local time proceeds as described later in detail. By comparing the variations with one another, the true position can be determined. More specifically, a triple measurement of distance is repeated twice and that one of the detected positions which is smaller in the absolute values of the difference between the estimated positions obtained at different local times is determined to be the true position.

(3) When the spot beam in which the mobile earth station exists is on the straight line m (30) of the satellite, intersections of a straight line passing through the center 41 of a spot beam 32-3 and perpendicular to the straight line m (30) and the spot beam coverage end are defined as candidates A (37) and B (38) for the initial value and the position of the mobile earth station is detected on the basis of the following inequalities:

When $\Delta r = r(t_{k+1}) - r(t_k) < 0$ (corresponding to an area 24 in FIG. 2),
:initial value A (37)
When $\Delta r = r(t_{k+1}) - r(t_k) \geq 0$ (corresponding to an area 27 in FIG. 2),
:initial value B (38)

where $r(t_k)$ and $r(t_{k+1})$ indicate distances between the satellite and the mobile earth station measured at time $t_k$ and $t_{k+1}$ and $\Delta r$ represent the difference between them. The initial values A and B are not limited specifically to the positions in FIG. 2 but any points can be used as long as they are in respective areas.

By observing variations in the measured distance data between the satellite and the mobile earth station as described above, the estimated area of the mobile earth station can be limited to the half area (24 or 27) of the spot beam coverage by the non-geostationary satellite.

(4) With respect to a spot beam containing the sub-satellite point 23, the both procedures (2) and (3) are used to determine the position of the mobile earth station.

Next, a description will be given of the reason for which in the case of the condition (2), the estimated position of the mobile earth station can uniquely be determined relative to its true position by observing, whenever necessary, estimated positions of the mobile earth station obtained as two solutions at proper time intervals, comparing with one another the amounts of movement in the estimated positions occurring as the local time proceeds and selecting an estimated position of the minimum movement.

Figure 6:
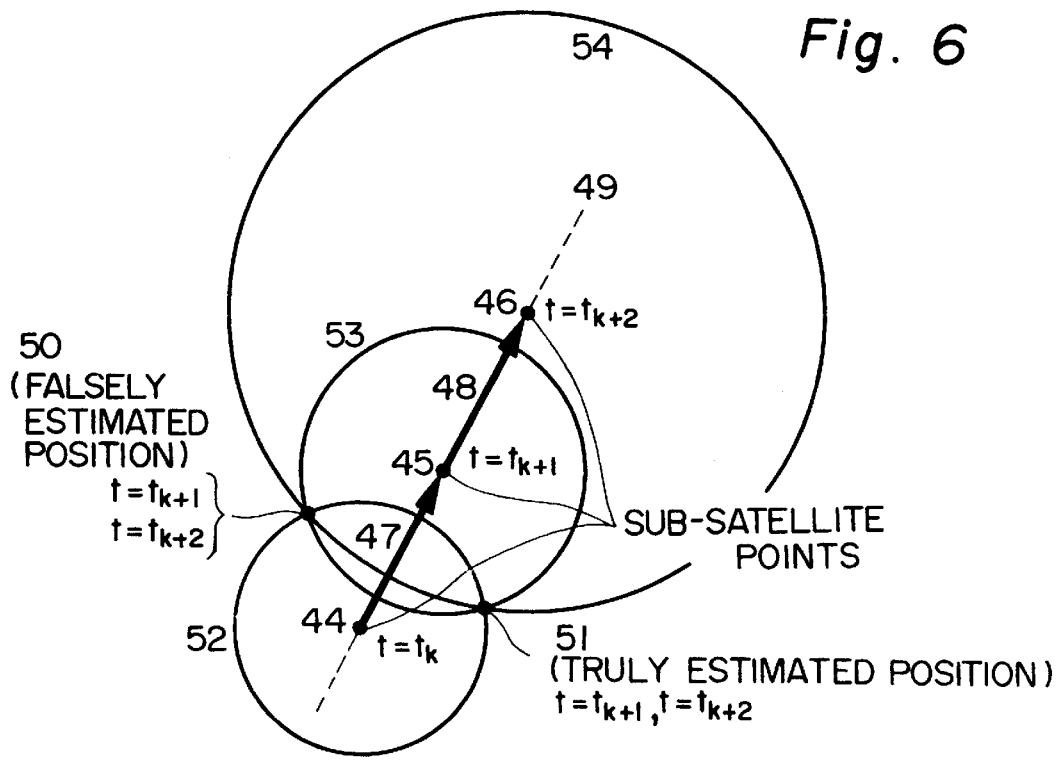
FIG. 6 is a diagram showing a temporal moving characteristic of an estimated position in a simple model explanatory of the invention.

FIG. 6 shows the movement characteristic of the estimated position that is obtainable on the assumption that the sub-satellite point moves in a fixed position relative to the earth, that is, that the velocity vector of the sub-satellite point is fixed relative to the earth surface. This corresponds to the case of detecting the position of the mobile earth station with a simple model with no regard to the rotation of the earth. In FIG. 6, points 44, 45 and 46 represent sub-satellite points at local times $t_k$, $t_{k+1}$ and $t_{k+2}$, and circles 52, 53 and 54 represent intersections of spheres whose radii are distances between the satellite and the mobile earth station measured at local times $t_k$, $t_{k+1}$ and $t_{k+2}$ and the earth, respectively. A straight line 49 indicates the locus of the sub-satellite point on the earth surface, and arrows 47 and 48 velocity vectors of the sub-satellite points at local times $t_k$ and $t_{k+1}$. In this case, the estimated position of the earth station is obtained as the intersection of the circles 52 and 53 at time $t_{k+1}$ and as the intersection of the circles 53 and 54 at time $t_{k+2}$; at any point in time, two identical solutions 50 and 51 are provided. That is, since the two intersections 50 and 51 are always detected as estimated positions of the mobile earth station, no distinction can be made between the truly estimated position 51 and the falsely estimated position 50.

Figure 7:
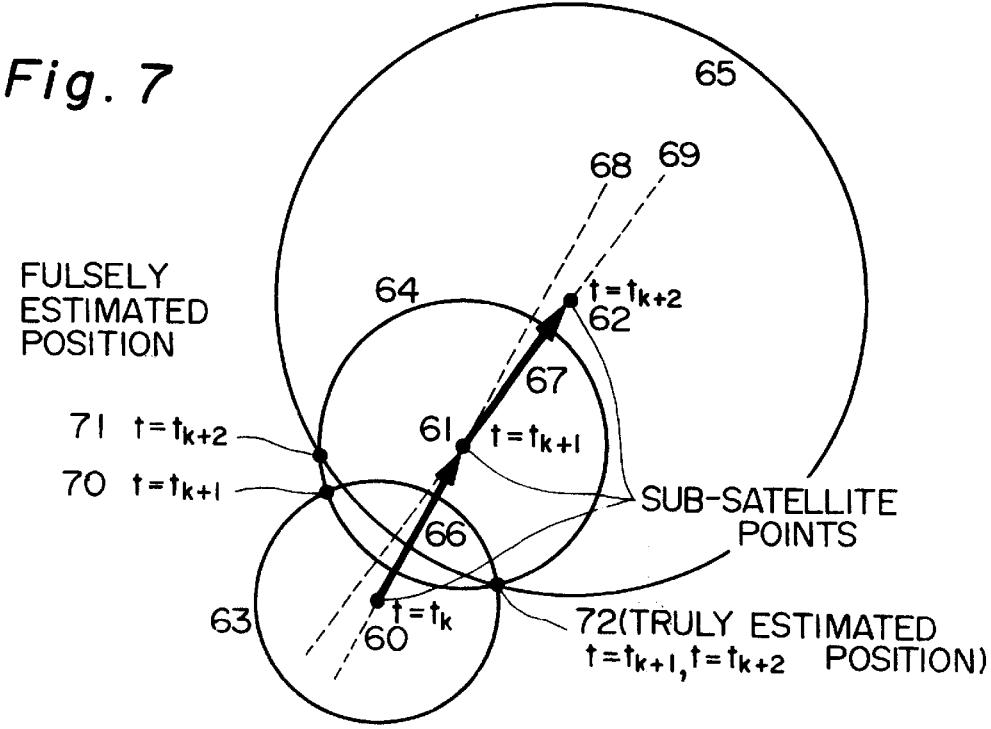
FIG. 7 shows a temporal moving characteristic of the estimated position in an actual model on which the present invention is based.

FIG. 7 shows the moving characteristic of the estimated positions of the earth station which are obtained in the actual system in which the velocity vector of the sub-satellite point relative to the mobile earth station varies as the local time proceeds, and this corresponds to the case of detecting the position of the mobile earth station with a model taking into account the rotation of the earth and the angle of inclination of the orbit of the satellite. In FIG. 7, points 60, 61 and 62 represent sub-satellite points at local times $t_k$, $t_{k+1}$ and $t_{k+2}$, and circles 63, 64 and 65 intersections of spheres whose radii are the distances between satellite and the mobile earth station measured at the respective times and the earth, Arrows 66 and 67 indicate the velocity vectors of the sub-satellite points at local times $t_k$ and $t_{k+1}$, respectively, a straight line 68 a straight line including the velocity vector 66 at time $t_k$, and a straight line 69 a straight line including the velocity vector 67 at time $t_{k+2}$. The estimated position of the mobile earth station is obtained as the intersection of circles 73 and 74 at time $t_{k+1}$ and as the intersection of circles 74 and 75 at time $t_{k+2}$, but it is provided as two intersections 72 and 70 at time $t_{k+1}$ and as two intersections 72 and 71 at time $t_{k+2}$. That is, it is seen that the intersection 72, which is the true estimated position, is detected as the same estimated position at any time, whereas a falsely estimated position moves as the local time proceeds along the intersections 70 and 71. Thus, the estimated position of the mobile earth station can uniquely be determined by observing the two estimated positions by the least means square method at all times or at regular time intervals, comparing the amounts of movement of the two solutions with respect to the local time and selecting that one of the solutions whose movement is smaller than the other. Incidentally, the schemes described above are applicable not only to the position determination by the least mean square method but also to a method of analytically seeking solutions and an estimation method using a Kalman filter; the schemes permit solution of the problem of ambiguity in the detected position which is left unsettled in all of positioning methods.

Figure 8:
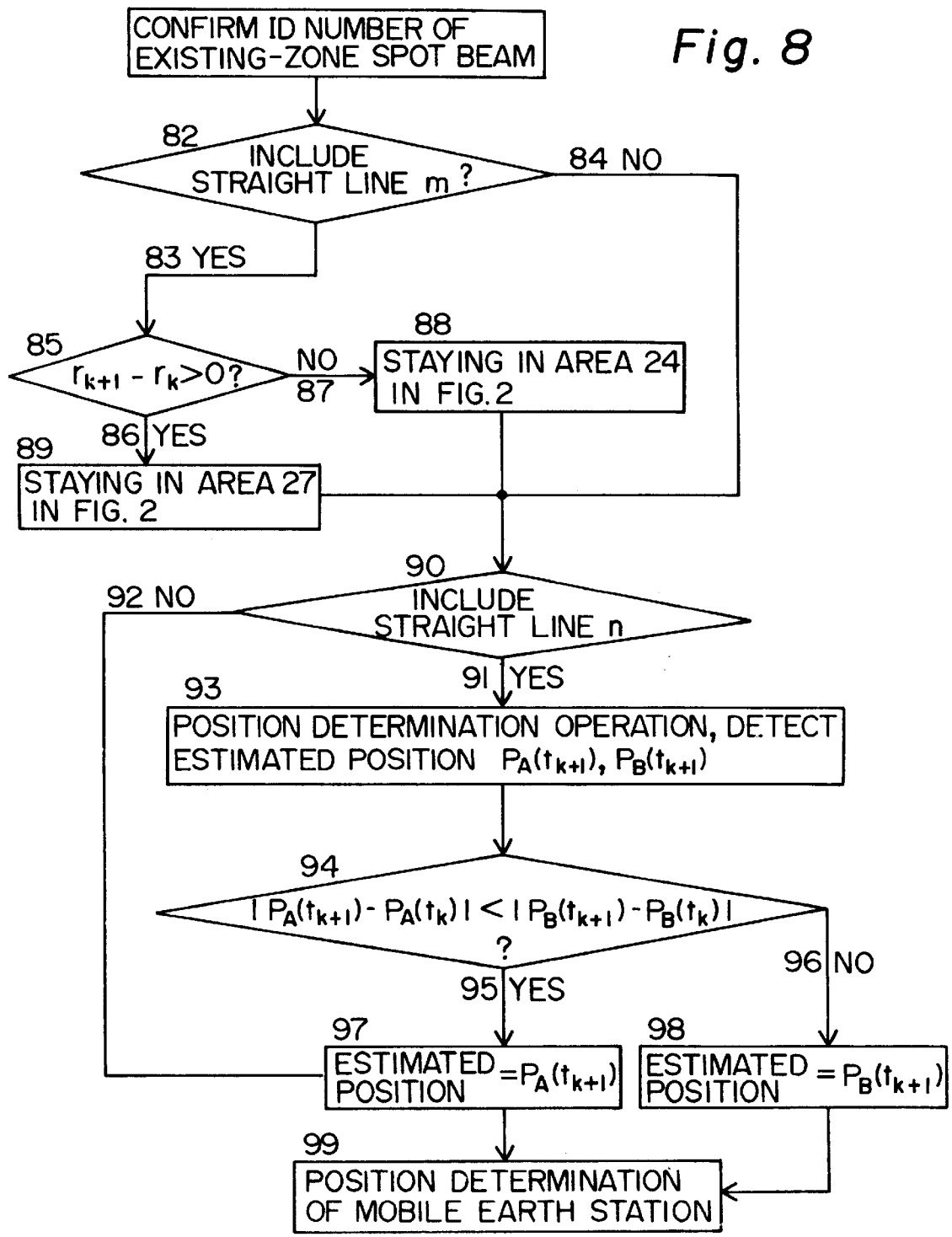
FIG. 8 is a diagram showing an example of a flowchart of the satellite position determination system according to the present invention.
Figure 9:
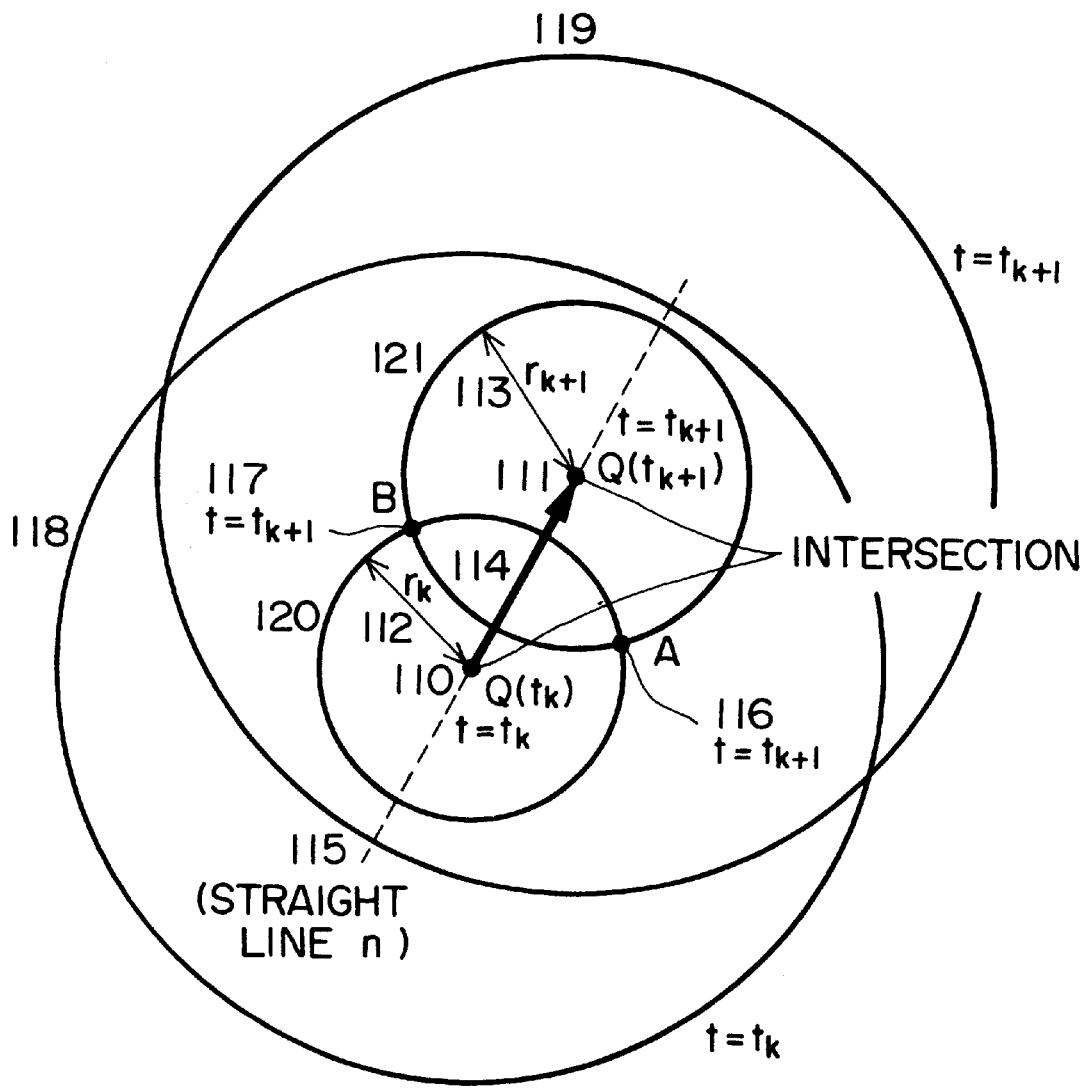
FIG. 9 is a diagram illustrating an example of the mobile earth station position determination method in a conventional satellite communication system.

Finally, FIG. 8 shows, by way of example, a flowchart for estimating the position of the mobile earth station in accordance with the present invention. By following the procedure of this flowchart, the position of the mobile earth station can uniquely be estimated. At first, the mobile earth station is capable of detecting the ID number of its existing-zone spot beam from signalling channel information that is sent via the satellite from a land earth station. Next, the mobile earth station sends the ID number of its own and the ID number of its existing spot beam to the land earth station through the use of a request signal or a data signal that is sent on the basis of a control procedure for position updating. The land earth station confirms the ID number of the existing-zone spot beam (81) and judges whether the spot beam includes the straight line m (82). When the existing-zone spot beam does not include the straight line (84), the process goes to the next step (90). On the other hand, in the case where the existing-zone spot beam includes the straight line m (83), the earth station to be detected is judged to stay in the area 27 in FIG. 2 on the basis of the procedure (3) when $\Delta r = r(t_{k+1}) - r(t_k) \geq 0$ (86), and in the opposite case (87), it is judged that the mobile earth station stays in the area 24 in FIG. 2, and the process proceeds to the next step (90).

Figure 3:
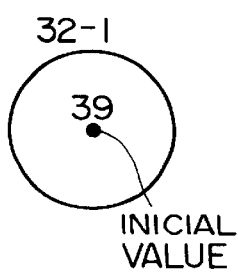
FIG. 3 is a diagram illustrating an embodiment of a method for setting initial values for the least mean square method employed in the present invention.

Next, the land earth station judges whether the existing-zone spot beam includes the straight line n (90), and when the existing-zone spot beam does not include the straight line n and the straight line m at the same time (a combination of steps 84 and 92), the position of the mobile earth station can uniquely be estimated by setting the initial value for the least mean square method as shown in FIG. 3 and performing the operation for position determination (97, 99). On the other hand, when the existing-zone spot beam includes the straight line n but does not include the straight line m (a combination of steps 84 and 91), initial values for the least mean square method as shown in FIG. 4 and two initial values are used to perform calculations for the detection of the position of the mobile earth station, by which two estimated positions $P_A (t_{k+1})$ and $P_B (t_{k+1})$ can be detected at the same time (93). By comparing the absolute values of movement of the estimated positions as the local time proceeds selecting the estimated position of the smaller movement (94, 95, 96), the estimated position of the mobile earth station can uniquely be determined (97,98,99). Furthermore, when the existing-zone spot beam does not include the straight line n but include the straight line m (a combination of steps 83 and 92), the position of the mobile earth station can uniquely be determined by setting the initial value for the least mean square method as shown in FIG. 4 (97, 99). When the existing-zone spot beam includes both of the straight lines n and m at the same time (a step of steps 83 and 91), the area where the mobile earth station stays is limited by steps 85 to 89 and two initial values which satisfies the relationship depicted in FIG. 4 are properly selected in the limited area. Then, two estimated positions by the least mean square method are compared with each other by steps 94 to 99 and one of them is selected, by which the position of the mobile earth station can uniquely be determined.

As described above in detail, the present invention brings about such effects as listed below.

(1) The initial values for the least mean square method need not be prepared corresponding to points over the entire area of the earth surface; in concrete terms, several points (four more points) need only to be prepared.

(2) It is possible to substantially reduce the amount of processing including redundant processing for determining the initial value for the least mean square method and processing for prestoring a large number of initial values in and reading them out from storage elements.

(3) By expressing the value of the Z coordinate of the mobile earth station with the values of its X and Y coordinates as two unknown variables through utilization of the fact that the earth is a sphere, it is possible to reduce the amount of information necessary for the measured distance between the mobile earth station and the satellite and the Doppler shift amount between them, permitting reduction of the time for position determination.

(4) It is possible to perform high accuracy position determination by estimating and compensating for the timing error arising from instability in the accuracy of the clock of the mobile earth station and the frequency error resulting from instability of the frequency oscillator of the mobile earth station.

(5) By observing variations in the data on the measured distance between the satellite and the mobile earth station, the existing zone where the mobile earth station stays can be limited to one-half area of the beam coverage by the non-geostationary satellite. This procedure limits the initial values for the least mean square method to two, and hence permits reduction of the amount of processing for position determination.

(6) The estimated position of the mobile earth station relative to its true position can uniquely be determined by observing, whenever necessary, estimated positions of the mobile earth station obtained as a plurality of solutions, comparing with one another the movements of the estimated positions occurring with the local time proceeds and selecting an estimated position of the minimum amount of movement. This operation allows ease in solving the problem of ambiguity of the estimated positions in the same spot beam which has been left unsolved in the past; hence, the position of the user can be uniquely determined with high accuracy.

What we claim is:

1. A method for determining a position of one mobile earth station of a plurality of mobile earth stations in a satellite communication system composed of non-geostationary satellites for communicating with a terrestrial communication network, said mobile earth stations each for communication with at least one of said non-geostationary satellites and land earth stations each connected to said terrestrial communication network for communication with said mobile earth stations via said non-geostationary satellites, said method comprising the steps of:

assuming an XYZ three-dimensional orthogonal coordinate system wherein a given point of a preknown position on the earth surface is positioned as a reference point and defined as a center coordinate of a reference three-dimensional coordinate system, a straight line which extends from the central point of the earth toward said center coordinate is defined as a Z-axis of said three-dimensional coordinate system, a straight line in contact with the earth surface and orthogonal to the equator of the earth and passed through said center coordinate is defined as a Y-axis of said three-dimensional coordinate system, and a straight line in contact with the earth surface and parallel to the equator of the earth and passed through said center coordinate is defined as an X-axis of said three-dimensional coordinate axis;

making a first-order estimation of a position of said one mobile earth station with respect to the reference coordinate system by the use of the information on a measured distance and a Doppler shift amount between said one mobile earth station of unknown position and any one of said non-geostationary satellites;

making a second-order estimation of the position of said one mobile earth station by using measured distance and Doppler shift amount, in a newly updated three-dimensional coordinate system using, as a center coordinate, the estimated position of said one mobile earth station obtained by said first-order estimation;

making a plurality of higher-order estimation operations of the position of said one mobile earth station by using measured distances and Doppler shift amounts, in a finally updated three-dimensional coordinate system using, as a center coordinate, the estimated position of said one mobile earth station obtained by a just preceding-order estimation, until a distance error between the center coordinate of said finally updated three-dimensional coordinate system and a newly obtained higher-order estimated position of said one mobile earth station comes to be less than a predetermined, extremely small threshold value; and determining said higher-order presumed position at the completion of an estimated position of said one mobile earth station, thereby determining the position of said one mobile earth station with high accuracy.

2. A method for determining a position of one mobile earth station of a plurality of mobile earth stations in a satellite communication system according to claim 1, in which amounts of said plurality of times-measured information necessary for the measured distance and the Doppler shift amount between said one mobile earth station and said one non-geostationary satellite are reduced by expressing the value of the Z coordinate of the position of said one mobile earth station with values of the X and Y coordinates as two unknown variables through utilization of the fact that the earth is a sphere.

3. A method for determining a position of one mobile earth station of a plurality of mobile earth stations in a satellite communication system according to claim 1, in which an error in time arising from instability in the position of said each mobile earth station and in the accuracy of a clock of said one mobile earth station and an error in frequency arising from instability of a frequency oscillator of said one mobile earth station are simultaneously estimated by using a plurality of times-measured information about the distance and Doppler shift amount between said one mobile earth station and said one non-geostationary satellite, so that values of said errors are reduced.

* * * * *